Aug. 11, 1964   B. F. ERLANGER   3,144,484
CHROMOGENIC SUBSTRATE FOR USE IN ASSAYING ENZYMIC ACTIVITY
Filed Oct. 18, 1962
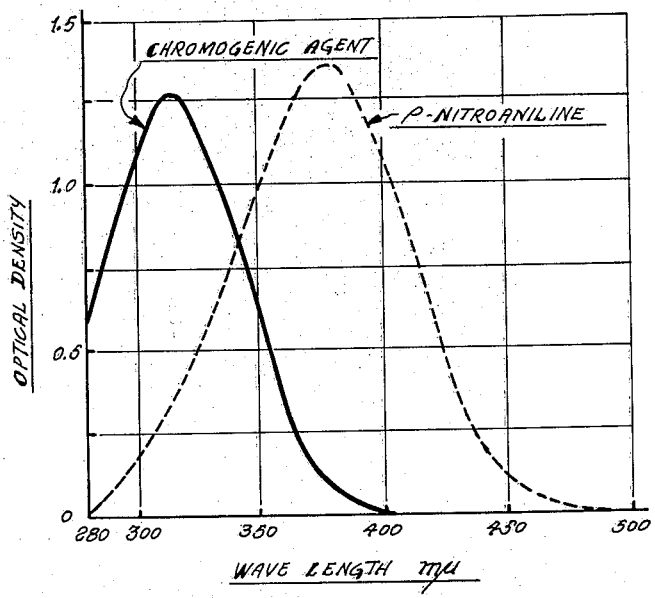
INVENTOR.
BERNARD F. ERLANGER

United States Patent Office 3,144,484
Patented Aug. 11, 1964

3,144,484
CHROMOGENIC SUBSTRATE FOR USE IN ASSAYING ENZYMIC ACTIVITY
Bernard F. Erlanger, Beechhurst, N.Y., assignor to the United States of America as represented by the Secretary of the Navy
Filed Oct. 18, 1962, Ser. No. 231,606
1 Claim. (Cl. 260—562)

This invention relates to a new chromogenic material for use with enzymes and particularly to L-lysine p-nitroanilide dihydrobromide.

The task of assaying enzymic activity has been simplified appreciably by the use of chromogenic substrates. For example, studies on the reactivation of enzymes are facilitated by the availability of substrates, the hydrolysis of which can be followed colorimetrically by subsequent coupling reactions with organic dye-like salts. In many cases, however, what is needed is a direct chromogenic substrate, one that would release a colored product as a direct result of enzyme activity rather than one requiring a subsequent coupling reaction to indicate the extent of hydrolysis. For instance, in the case of trypsin, there are few if any, chromogenic substrates readily available.

I have now discovered a chemical, L-lysine p-nitroanilide dihydrobromide, which, upon tryptic hydrolysis, will release a colored product but which will not hydrolyze appreciably in the absence of enzyme. However, tryptic hydrolysis of this substrate produces p-nitroaniline, which is yellow and, as a result, the presence, degree of activity, and assay of this enzyme can be estimated colorimetrically.

An object of this invention is to provide a new chromogenic material for use in determining the presence, degree of activity, and assay of trypsin and trypsin-like enzymes in biological systems.

Other objects and many of the attendant advantages of the invention will be readily appreciated as the same become better understood by reference to the following detailed description and drawings wherein FIG. 1 is a chart showing a comparison between the absorption spectra of L-lysine p-nitroaniline dihydrobromide and p-nitroaniline, the latter being the product of hydrolysis of the former.

L-lysine p-nitroanilide dihydrobromide was prepared by the dicarbobenzoxylation of dicarbobenzoxy L-lysine, using hydrogen bromide in glacial acetic acid, the carbobenzoxylated intermediate having been synthesized via the condensation of dicarbobenzoxy L-lysine and p-nitroaniline in the presence of dicyclohexylcarbodiimide.

Example 1

3.9 g. of dicyclohexylcarbodiimide dissolved in 25 ml. tetrahydrofuran was mixed with 250 ml. of a tetrahydrofuran solution containing 7.8 g. Nα,Nε-dicarbobenzoxy L-lysine and 2.6 g. p-nitroaniline. After standing for 24 hours at room temperature, the reaction mixture was filtered and the precipitate, dicyclohexylurea, discarded. The filtrate was concentrated in vacuo, and the residue was taken up in ethyl acetate and washed successively with 2 N HCl, water, 2% sodium bicarbonate, and water. Removal of the solvent in vacuo left a residual oil which was crystallized from ethanol-water and recrystallized from absolute ethanol. This yielded 3 g. of dicarbobenzoxy L-lysine p-nitroanilide having a M.P. of 146°–148°. One gm. of this product was dissolved in 12 ml. of a 30% solution of hydrogen bromide in acetic acid and kept at room temperature for 1 hour. L-lysyl p-nitroanilide dihydrobromide was precipitated by the addition of 600 ml. of anhydrous ether and was crystallized from methanol-dry ether. 0.5 g. of the product was produced having an M.P. of 254–257°.

L-lysine p-nitroanilide dihydrobromide is a chemical capable of being hydrolyzed by trypsin and it is generally supposed that hydrolysis of susceptible substrates of trypsin proceeds via a three step mechanism:

$$E + S \rightarrow ES \quad (1)$$
$$ES \rightarrow ES' + P' \quad (2)$$
$$ES' \rightarrow E + P \quad (3)$$

wherein E is the enzyme and S is the substrate. Step (1) yields the Michaelis-Menten complex ES followed by the acylation of the enzyme to yield ES' and P', the latter being either an alcohol or an amine depending upon the nature of the substrate. Step (3) is a deacylation step that yields free enzyme and the free amino acid or acylated derivative. Published data allows the conclusion that step (2), the acylation of the enzyme, is the rate determining step in the hydrolysis of amides by trypsin. On this basis, step (2), the acylation of the enzyme, is the rate determining step in the hydrolysis of amides by trypsin. On this basis, step (2) would be the rate limiting step in the hydrolysis of L-lysine p-nitroanilide dihydrobromide by trypsin.

A profile of the enzymic activity of trypsin was obtained by continuous measurement of free p-nitroaniline while the reaction proceeded in a Beckman DU spectrophotometric cuvette that was maintained at constant temperature. The absorption spectra of L-lysine p-nitroanilide dihydrobromide at a concentration of $10^{-4}$ M and pH 8.17 are shown in FIG. 1, as well as the spectrum of p-nitroaniline determined under identical conditions. The anilide possesses a maxima at 315 mu with an extinction coefficient of 13,000, while p-nitroanilene has a maxima at 380 mu (E max.=13,500), the spectrum of the latter remaining unchanged between pH 5 and 10.5. As shown, the curves overlap at 380 mu, therefore, the extent of hydrolysis could be determined by measurement of p-nitroaniline at 410 mu, at which wavelength the extinction coefficient is 8800 and no contribution to the overall absorbence is made by the anilides. The procedure set forth in Examples 2 and 3, which follow, are two of the experimental procedures used to study the activity of trypsin:

Example 2

2 ml. of a solution containing 4.82 mg. of L-lysine p-nitroanilide dihydrobromide in 25 ml. of 0.2 M Tris buffer having pH 8.65 were placed in a cuvette and allowed to reach an equilibrium temperature of 15°, at which time, 0.2 ml. of a solution containing 80 mg. of the enzyme trypsin in 4 ml. of 0.001 M HCl was added to the solution in the cuvette. Readings were made at 410 mu about every 10 or 15 seconds for approximately 5 minutes. The control contained 0.2 ml. of 0.001 M HCl in place of the enzyme. Similar experiments were performed following the above procedure and the kinetic constants was determined at substrate concentrations of $1.0 \times 10^{-4}$, $1.5 \times 10^{-4}$, $2.0 \times 10^{-4}$, and $3.0 \times 10^{-4}$.

Example 3

A $10^{-3}$ M stock solution of L-lysine p-nitroanilide dihydrobromide was prepared in the following manner:

43.5 mg. of the anilide was dissolved in 1 ml. of dimethylsulfoxide, and the solution was brought to 100 ml. with 0.05 M Tris buffer pH 8.2 containing 0.02 M CaCl₂. Care was taken to dissolve all of the substrate in the dimethylsulfoxide as the presence of any crystals might cause precipitation to occur on standing. Also, the temperature of this solution was never allowed to fall below 25°.

0.9 ml. of water was added to 5 ml. of the above stock solution and the mixture was allowed to equilibrate in a thermostatically controlled bath at 25° for 5 minutes.

At zero time, 0.1 ml. of an enzyme solution containing 20 mg. of trypsin per 1 ml. in 0.001 N HCl was added, and the reaction was allowed to run 600 seconds. In each experiment a suitable control without enzyme was also used. The addition of 1.0 ml. of 30% acetic acid terminated the reaction and the quantity of nitroaniline was estimated spectrophotometrically at 410 mu in a Bausch and Lomb Spectronic 20 using 19 x 150 mm. cuvettes and the data was recorded.

It is apparent from the foregoing description that I have discovered a new chromogenic material, L-lysine p-nitroanilide dihydrobromide, which due to its activity and indicator-like properties, i.e. the release of color upon hydrolysis, is ideal for detection, kinetic studies and quantitative determinations of trypsin and trypsin-like enzymes in biological systems.

Obviously, many modifications and variations of the present invention will become apparent to one skilled in the art in view of the above teaching so that it is to be understood that the invention, as set forth in the appended claim may be practiced otherwise than as described.

I claim:

L-lysine p-nitroanilide dihydrobromide.

References Cited in the file of this patent

Erlanger et al.: Archives of Biochemistry and Biophysics, vol. 95, No. 2, pages 271–8 (November 1961).